(12) United States Patent
Sato et al.

(10) Patent No.: US 7,779,688 B2
(45) Date of Patent: Aug. 24, 2010

(54) VIBRATION GYRO SENSOR

(75) Inventors: Kenji Sato, Matsumoto (JP); Tatsunori Nakamura, Minowa (JP); Yukihiro Unno, Matsumoto (JP)

(73) Assignee: Epson Toyocom Corporation (JP)

( * ) Notice: Subject to any disclaimer, the term of this patent is extended or adjusted under 35 U.S.C. 154(b) by 301 days.

(21) Appl. No.: 11/959,932

(22) Filed: Dec. 19, 2007

(65) Prior Publication Data

US 2008/0148847 A1    Jun. 26, 2008

(30) Foreign Application Priority Data

Dec. 20, 2006  (JP) .............................. 2006-342285
Nov. 2, 2007   (JP) .............................. 2007-285889

(51) Int. Cl.
*G01P 15/00*    (2006.01)
(52) U.S. Cl. ................. 73/504.12; 73/504.16
(58) Field of Classification Search ............. 73/504.12, 73/504.04, 504.13, 504.14, 504.15, 504.16
See application file for complete search history.

(56) References Cited

U.S. PATENT DOCUMENTS

| | | | | |
|---|---|---|---|---|
| 5,806,364 A * | 9/1998 | Kato et al. | ............... | 73/504.12 |
| 5,942,686 A * | 8/1999 | Bhardwaj | ............... | 73/504.16 |
| 6,705,151 B2 * | 3/2004 | Nozoe et al. | ............... | 73/1.37 |
| 7,000,471 B2 * | 2/2006 | Ito | ............... | 73/504.12 |
| 7,069,783 B2 * | 7/2006 | Uehara | ............... | 73/514.12 |
| 7,107,841 B2 * | 9/2006 | Mori | ............... | 73/504.12 |
| 7,216,538 B2 * | 5/2007 | Ito et al. | ............... | 73/504.12 |

FOREIGN PATENT DOCUMENTS

| | | |
|---|---|---|
| JP | 2001-296140 | 10/2001 |
| JP | 2006-010408 | 1/2006 |

* cited by examiner

*Primary Examiner*—Helen C. Kwok
(74) *Attorney, Agent, or Firm*—Harness, Dickey & Pierce, P.L.C.

(57) ABSTRACT

A vibration gyro sensor, including: a vibrating element; a pair of drive electrodes for driving the vibrating element; at least two detection electrodes for detecting Coriolis force applied to the vibrating element; a monitor circuit coupled with one of the pair of the drive electrodes, so as to output a monitor signal; a drive circuit for amplifying the monitor signal so as to output the amplified signal to the other of the pair of drive electrode; a differential amplifier circuit for differentially amplifying at least two signals obtained from the detection electrodes of the vibrating element, so as to output a differential amplified signal; a synchronous detection circuit for synchronously detecting the differential amplified signal with respect to the monitor signal, so as to output a detected signal; a filter circuit for outputting a filtered signal in which a noise of the detected signal is removed; and a ratiometric circuit which receives the filtered signal varied in proportion to a variation of a power voltage, so as to output a sensitivity signal.

10 Claims, 4 Drawing Sheets

VIBRATION GYRO SENSOR

BACKGROUND

1. Technical Field

The present invention relates to a vibration gyro sensor for detecting angular velocities.

2. Related Art

Car navigation devices specifies the position of a vehicle based on the angular velocity information provided by gyro sensors, in order to detect the direction of motion in autonomous navigation. Generally, these gyro sensors output analog signals which correspond to the magnitude of angular velocities. The analog signals are converted into digital signals with an A/D converter, and the digital signals are retrieved into a navigation system, so as to be used in arithmetic processing. During the conversion of analog signals to digital signals, the fluctuation of a power voltage of the A/D converter may cause a fluctuation in a reference voltage of the A/D converter and in a voltage width of each resolution of the A/D converter. Thus, gyro sensors provided with ratiometric functions are suggested, in order to vary the analog signal being output from the gyro sensor, in accordance with the fluctuation of a power voltage, making a detection signal dependent on the power voltage.

For instance, a gyro sensor which has a multiplier circuit for amplifying a detection signal proportionally to a power voltage has embodied a ratiometric function with a drive signal dependent on a power voltage. Instead, with the detection signal dependent on the power voltage, the decline in dependency accuracy with respect to the power voltage is prevented, the decline being caused by a conversion error in an electrical/mechanical and mechanical/electrical conversion (refer to JP-A-2006-10408 and JP-A-2001-296140 for examples).

However, detection signals and power voltages contain noises that include many frequency components. The multiplier circuit referred to in JP-A-2006-10408 amplifies a detection signal input from a wiring line, in proportion to a divided voltage Ve which is dependent on a power voltage. It is known that, in multiplier circuits, multiplying a signal with another signal, both having the same frequency component, produces a signal having doubled frequency component and a direct current. In other words, if two input signals are both sin A, then sin A*sin A becomes (1−cos 2A/2). Therefore, both the detection signal and the power noise receive the same frequency component. As a result, the error component of the direct current is added to the detection signal, thereby lowering the measurement accuracy.

Moreover, JP-A-2001-296140 discloses a structure in which a filter circuit is installed before an absolute voltage-ratio conversion circuit. However, this absolute voltage-ratio conversion circuit is driven by two differential voltages. One differential voltage represents a difference between a reference voltage input from an absolute reference voltage circuit and an input signal input from a filter. Another differential voltage represents a difference between an output voltage of a voltage divider circuit and an output voltage of a sub voltage divider circuit. In other words, circuits such as differential amplifier circuit that outputs differential voltage is needed before a circuit that realizes the ratiometric function. Consequently, in the event of power noises being generated in a circuit provided subsequently to the filter, the measurement accuracy declines, since an error component of a direct current is added to a detection signal. This decline is caused by the power noises that have the same frequency components being input into a power source as well as into an input signal of a circuit that realizes the ratiometric function.

SUMMARY

An advantage of the invention is to provide a high-accuracy vibration gyro sensor in which noises with the same frequency components present in a power voltage are not superimposed on a direct current.

According to an aspect of the invention, a vibration gyro sensor includes: a vibrating element; a pair of drive electrodes for driving the vibrating element; at least two detection electrodes for detecting Coriolis force applied to the vibrating element; a monitor circuit coupled with one of the pair of the drive electrodes, so as to output a monitor signal; a drive circuit for amplifying the monitor signal so as to output the amplified signal to the other of the pair of drive electrode; a differential amplifier circuit for differentially amplifying at least two signals obtained from the detection electrodes of the vibrating element, so as to output a differential amplified signal; a synchronous detection circuit for synchronously detecting the differential amplified signal with respect to the monitor signal, so as to output a detected signal; a filter circuit for outputting a filtered signal in which a noise of the detected signal is removed; and a ratiometric circuit which receives the filtered signal varied in proportion to a variation of a power voltage, so as to output a sensitivity signal.

In this aspect of the invention, the filter circuit is inserted before the ratiometric circuit, in order for the filter circuit to remove the noise of the detection signal. This allows the noise attenuation of the detection signal prior to the input of the detection signal into the ratiometric circuit. Therefore, the vibration gyro sensor has high accuracy, and the noise is not superimposed on a direct current, even if a noise with the same frequency component as that of detection signal is present in the power voltage.

In this case, the ratiometric circuit and a circuit which is previous to the filter circuit may receive a common power source.

Further, in the vibration gyro sensor, the filter circuit may be a passive low-pass filter.

The vibration gyro sensor according to the aforementioned aspect of the invention may further include: a first power circuit for supplying a first power source to the filter circuit; a second power circuit for supplying a second power source to the ratiometric circuit; a first reference voltage generation circuit which receives the first power source and supplies a first reference voltage to a circuit being previous to the ratiometric circuit; and a second reference voltage generation circuit which receives the second power source and supplies a second reference voltage to the ratiometric circuit.

This allows an effective inhibition of the superimposition of the power noise, in the event where power noises occur in the filter circuit and in the ratiometric circuit, since the frequency and the phase of those noises are different from each other.

In the vibration gyro sensor according to the aforementioned aspect of the invention, the filter circuit may be an active low-pass filter driven by the first power source.

Moreover, the vibrating element may be a double-T shaped vibrating element.

Further, the filter circuit may include an n-th order filter, where n is greater than or equal to 2.

Still further, the filter circuit may be immediately previous to the ratiometric circuit.

Even still further, the ratiometric circuit may include a multiplier.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereafter, an embodiment, into which the present invention is embodied, will now be described with reference to drawings.

Structure of Vibration Gyro Sensor

Figure 1:
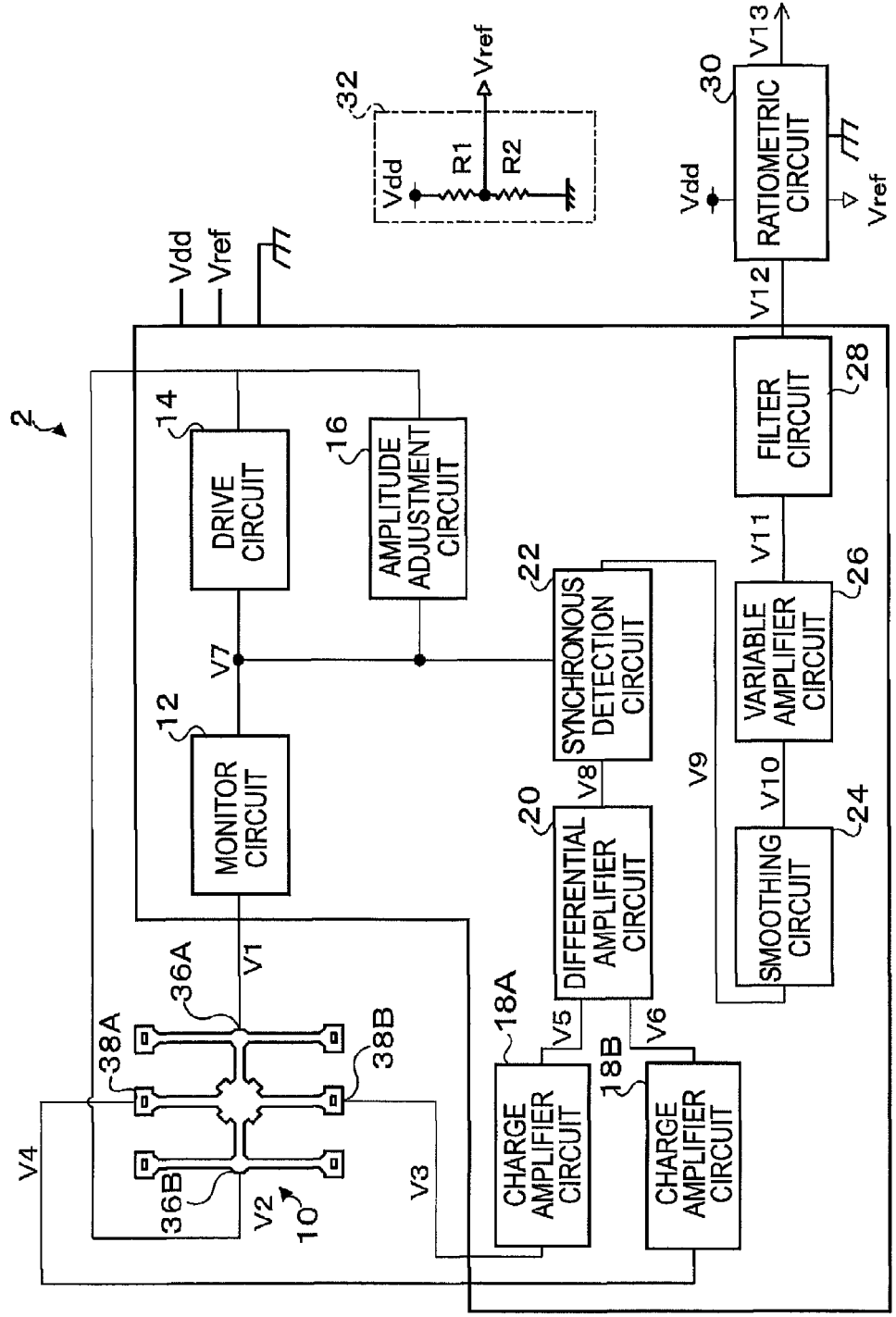
FIG. 1 is a block diagram of circuit configuration of a vibration gyro sensor according to an embodiment.

FIG. 1 is a block diagram of circuit configuration of a vibration gyro sensor according to the first embodiment. Referring now to FIG. 1, the structure of the vibration gyro sensor will be described. A vibration gyro sensor 2 includes, as shown in FIG. 1, a vibrating element 10, a monitor circuit 12, a drive circuit 14, and an amplitude adjustment circuit 16. The vibration gyro sensor 2 further includes charge amplifier circuits 18A and 18B which serve as amplifier circuits, a differential amplifier circuit 20, a synchronous detection circuit 22, a smoothing circuit 24, a variable amplifier circuit 26, a filter circuit 28, a ratiometric circuit 30, and a reference voltage generation circuit 32.

Figure 2:
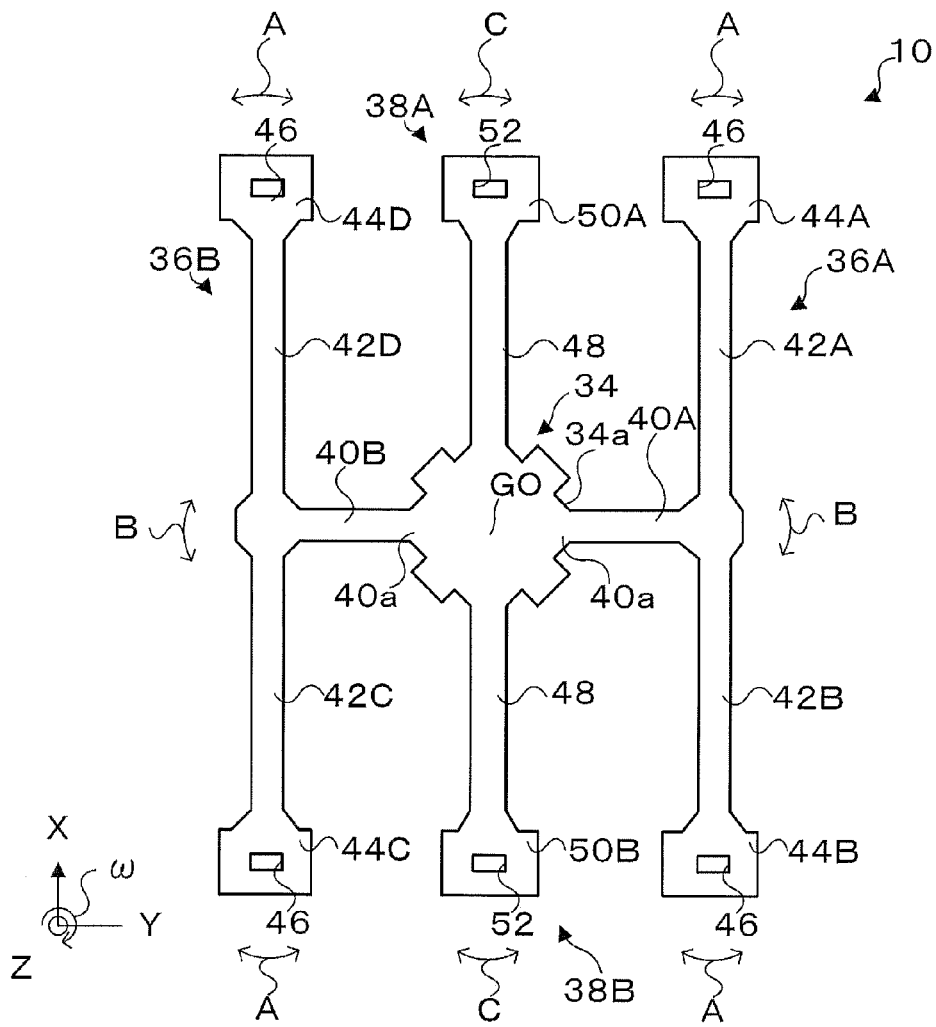
FIG. 2 is a plan view illustrating a vibrating element included in the vibration gyro sensor according to an embodiment.

Referring now to FIG. 2, the structure of the vibrating element will be described.

FIG. 2 is a plan view illustrating the vibrating element included in the vibration gyro sensor according to this embodiment.

The vibrating element 10 is, as shown in FIG. 2, includes: a base 34; a pair of vibration drive systems 36A and 36B which has a pair of drive electrodes for driving the vibrating element 10; and a pair of vibration detection systems 38A and 38B which has at least two detection electrodes for detecting Coriolis force applied on the vibrating element 10. The base 34 is approximately square, and has four-fold rotational symmetry, a center of mass GO of the vibrating element being a point of symmetry. Here, the center of mass GO is the one during which the vibrating element is not vibrating. The vibration drive systems 36A and 36B, as well as vibration detection systems 38A and 38B are respectively extending out from the side in a perimeter 34a of the base 34.

The vibration drive systems 36A and 36B include: elongated supports 40A and 40B extending from the perimeter 34a of the base 34 in a radial direction; a pair of vibrating drive reeds 42A and 42B; and another pair of vibrating drive reeds 42C and 42D. In this embodiment, hammerheads (weighty part) 44A, 44B, 44C, and 44D wider than the other parts are provided at the ends of the vibrating drive reeds. Each of the hammer heads 44A, 44B, 44C, and 44D has a through hole 46. Each of the vibrating drive reeds 42A, 42B, 42C, and 42D are provided with a drive electrode.

The vibration detection systems 38A and 38B include elongated vibrating detection reeds 48 which extend out from the perimeter 34a of the base 34 in a radial direction. In this embodiment, hammerheads (weighty part) 50A and 50B wider than the other parts are provided at the ends of the vibrating detection reeds 48. Each of the hammerheads 50A and 50B is provided with a through hole 52. Un-illustrated detection electrodes for detecting the Coriolis force are provided in the vibrating detection reeds 48, one of them extending from the base 34 to the hammerhead 50A, and the other extending from the base 34 to the hammerhead 50B. Two or more detection electrodes may be provided.

In this embodiment, the vibrating element 10 is double-T (WT) shaped, formed with piezoelectric materials such as quartz.

The operation of the vibrating element 10 will now be described. Using the drive electrodes, the vibrating drive reeds 42A and 42B are excited in the same phase in the direction of an arrow A, and the vibrating drive reeds 42C and 42D are excited in the same phase also in the direction of an arrow A. The center of mass in each of the vibrating drive reeds 42A to 42D during the drive vibration is located at, or, in the vicinity of, the center of mass GO of the vibrating element 10.

Rotating the vibrating element 10 within a predetermined plane (x-y plane) in the ω direction causes Coriolis force to work in the vibrating element 10 during the rotation. As a result, the supports 40A and 40B vibrate transversally, each having a point of attachment 40a to the base 34 as a center of vibration, as shown in arrows B. At this time, the phases of the transversal vibrations of the supports 40A and 40B are opposite from each other in the circumferential direction, having the center of mass GO as a center. Corresponding to the above vibration, the vibrating detection reeds 48 vibrate transversally as shown in arrows C, each having a point of attachment as a center of vibration. The transversal vibration of the vibrating detection reeds 48 generates signal voltages in the detection electrodes, and an angular velocity is calculated from these signal voltages.

Preferably, the vibration drive systems 36A and 36B are rotational symmetric, a point of symmetry being the center of mass GO. Here, the vibration drive systems 36A and 36B are in the same predetermined plane, and are away from each other in the same predetermined rotation angle, having the center of mass GO as a center therebetween. Consequently, by rotating one vibration drive system in a predetermined plane in a predetermined angle, this vibration drive system comes to a position of the other vibration drive system. For instance, referring back to FIG. 2, the vibration drive system 36A and the vibration drive system 36B are away from each other in a rotation angle of 180°. Therefore, rotating the vibration drive system 36A by 180° brings it to the position of the vibration drive system 36B. Two-fold, three-fold, and four-fold rotational symmetries are preferable.

Thereafter, as shown in FIG. 1, the monitor circuit 12 is coupled with the drive electrodes in the vibration drive system 36A of the vibrating element 10. This monitors a potential V1 of the vibration drive systems 36A and outputs a monitor signal V7. The drive circuit 14 is coupled with the drive electrodes in the vibration drive system 36B of the vibrating element 10, and outputs a drive signal V2 from the monitor signal V7. The amplitude adjustment circuit 16 is coupled with the drive circuit 14 in parallel, and adjusts an amplitude of the drive signal V2 to a certain state.

The charge amplifier circuit 18A is coupled with the detection electrodes in the vibration detection system 38B of the vibrating element 10, and amplifies a signal V3 so as to output a detection signal V5. The charge amplifier circuit 18B is coupled with the detection electrodes in the vibration detection system 38A of the vibrating element 10, and amplifies a signal V4 so as to output a detection signal V6. The differential amplifier circuit 20 is coupled with the charge amplifier circuits 18A and 18B, and carries out differential amplification of the detection signals V5 and V6, so as to output a differential amplified signal V8.

The synchronous detection circuit 22 is coupled with the differential amplifier circuit 20 as well as with the monitor circuit 12, and carries out synchronous detection of the differential amplified signal V8 with respect to the monitor signal V7, so as to output a detected signal V9.

The smoothing circuit 24 is coupled with the synchronous detection circuit 22, and smoothes the detected signal V9 so as to output a smoothed signal V10.

The variable amplifier circuit 26 is coupled with the smoothing circuit 24, and changes an angular velocity sensitivity of the smoothed signal V10, so as to output a variable amplified signal V11.

The filter circuit 28 is coupled with the variable amplifier circuit 26, and removes a noise from the variable amplified signal V11 so as to output a filtered signal V12. The filter circuit 28 is placed before the ratiometric circuit 30. The filter circuit 28 may also be placed immediately before the ratiometric circuit 30. In this embodiment, the filter circuit 28 may also include a switched capacitor filter (SCF) circuit. The frequencies of the SCF circuit may be operated by inputting the monitor signal V7 obtained from the vibrating element 10. Moreover, the filter circuit 28 may include n-th order filters, where n is equal to or greater than 2.

The ratiometric circuit 30 is coupled with the filter circuit 28, and outputs a sensitivity signal V13 obtained using a power voltage Vdd, a reference voltage Vref, and the filtered signal V12. The ratiometric circuit 30 is placed after the filter circuit 28. The ratiometric circuit 30 may be placed immediately after the filter circuit 23. In this embodiment, the ratiometric circuit 30 may also be a multiplier. Moreover, the ratiometric circuit 30 may also be a Gilbert cell multiplier. Further, the ratiometric circuit 30 may also be a gain control amplifier. Still further, the ratiometric circuit 30 may also be a current control amplifier. With the above structures, the circuit design is simplified by using any one of the multiplier, the Gilbert cell multiplier, the gain control amplifier, and the current control amplifier as a ratiometric circuit.

The reference voltage Vref output from the reference voltage generation circuit 32 operates the charge amplifier circuits 18A and 18B, the differential amplifier circuit 20, the synchronous detection circuit 22, the smoothing circuit 24, the variable amplifier circuit 26, the filter circuit 28, and the ratiometric circuit 30.

Output Signals of Vibration Gyro Sensor

Figure 3:
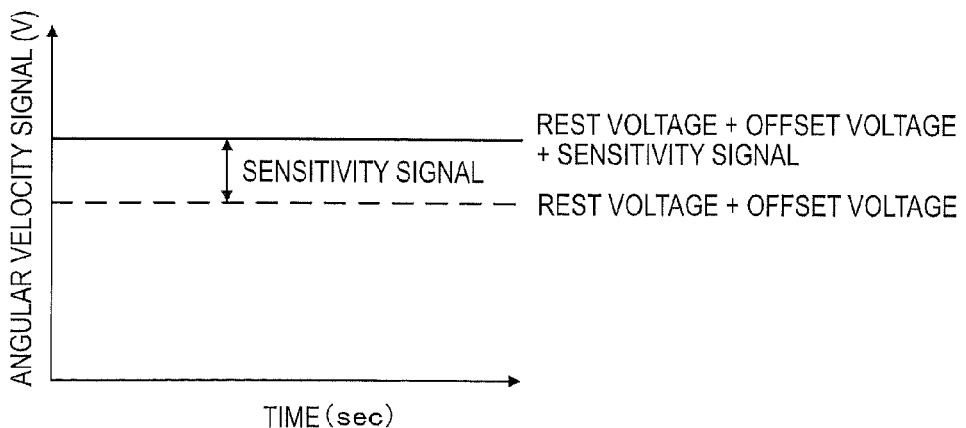
FIG. 3 is a graph indicating an output signal of the vibration gyro sensor according to an embodiment.

Referring now to FIG. 3, an output signal of the vibration gyro sensor will be described.

FIG. 3 is a graph indicating an output signal of the vibration gyro sensor according to this embodiment. As shown in FIG. 3, the output signal of the vibration gyro sensor is composed with three largely categorized signals including a sensitivity signal, a rest voltage, and an offset voltage.

The sensitivity signal is output as the filtered signal V12 produced from a charge generated by the Coriolis force in the vibrating element 10, by using the charge amplifier circuits 18A and 18B, the differential amplifier circuit 20, the synchronous detection circuit 22, the smoothing circuit 24, the variable amplifier circuit 26, and the filter circuit 28. The rest voltage is in a state with no angular velocity applied, and serves as a reference voltage of the vibration gyro sensor 2. The rest voltage can be either set to half of the power voltage Vdd (i.e. Vdd/2), or, any desired voltage set by a user. The offset voltage is a difference in the voltages between the rest voltage and the reference voltage, and is generated by elements such as a leak signal leaking from the vibrating element 10 and a differential amplifier of the vibration gyro sensor 2.

Sensitivity Signal of Ratiometric Circuit

The sensitivity signal of the ratiometric circuit 30 will now be described with reference to FIG. 1. As shown in FIG. 1, the reference voltage generation circuit 32 includes resistors R1 and R2.

The resistors R1 and R2 are coupled in series between the power voltage Vdd and the ground potential, and the reference voltage Vref, being an output voltage of the coupling point of the resistors R1 and R2, is expressed as "Vref=Vdd*R2/(R1+R2)".

The ratiometric circuit 30 receives the filtered signal V12 (an output voltage of the filter circuit 28) and the reference voltage Vref of the reference voltage generation circuit 32. The ratiometric circuit 30 outputs the sensitivity signal V13.

A circuit operation reference voltage provided to the circuits that are present between the synchronous detection circuit 22 and the ratiometric circuit 30 (inclusive) depends on the power voltage Vdd, and a reference voltage of the angular velocity output voltage (the rest voltage) is proportional to the power voltage Vdd. The ratiometric circuit 30 multiplies the reference voltage Vref generated in the reference voltage generation circuit 32 by an amplitude of the filtered signal V12 output from the filter circuit 28 which is positioned in the last sequence of the signal processing circuit. Here, the amplitude indicates a voltage deviation which corresponds to the angular velocity. In this case, the value of the reference voltage Vref is proportional to the power voltage Vdd. Therefore, the amplitude of the sensitivity signal V13 output from the ratiometric circuit 30 also depends on the power voltage Vdd. As described, what depends on the power voltage Vdd is only an amplification factor of the ratiometric circuit 30 positioned at the last stage of the signal processing circuit. Therefore, the sensitivity of the sensitivity signal V13 becomes purely power voltage dependent.

In this embodiment, the filter circuit 28 is inserted immediately before the ratiometric circuit 30, in order for the filter circuit 28 to remove the noise of the variable amplified signal V11. This allows the filter circuit 28 to attenuate the noise of the filtered signal V12 prior to inputting the filtered signal V12 into the ratiometric circuit 30. Therefore, the vibration gyro sensor 2 has high accuracy, and the noise is not superimposed on a direct current, even if the noise with the same frequency component as that of the filtered signal V12 is present in the power voltage Vdd.

Comparative Example

A case of reversing the coupling order of the variable amplifier circuit 26 and the filter circuit 28 will now be described as a comparative example according to an aspect of the invention. Here, the smoothed signal V10 output from the smoothing circuit 24 is input into the filter circuit 28; the filtered signal V12 of the filter circuit 28 is input into the variable amplifier circuit 26; and the variable amplified signal V11 output from the variable amplifier circuit 26 is input into the ratiometric circuit 30. If a power noise occurs, variable amplified signal V11 containing a noise that has the same frequency component as that of the power noise is input into the ratiometric circuit 30 without going through a filter. Thereafter, the power noise and the noise of the variable amplified signal V11 are superimposed in the ratiometric circuit 30, and therefore an error component of the direct current is added, resulting in a reduction of measurement accuracy.

Moreover, as another comparative example, a case of reversing the coupling order of the filter circuit 28 and the ratiometric circuit 30 will be described. Here, the variable amplified signal V11 output from the variable amplifier circuit 26 is input into the ratiometric circuit 30; the sensitivity signal V13 output from the ratiometric circuit 30 is input into the filter circuit 28; and the filter circuit 28 outputs the result to a subsequent stage. Similar to the above, the power noise of the variable amplified signal V11 is input into the ratiometric circuit 30 without going through a filter. Thus the noise of the variable amplified signal V11 and the power noise are superimposed. As a result, an error component of the direct current is added to the sensitivity signal V13. This requires the filter circuit to have an advanced filtering characteristics in order for it to remove the superimposed noise, thereby complicating the circuitry of the filter circuit. As described, in order to remove the power noise from the sensitivity signal V13 after the superimposition of the power noise, it becomes necessary to increase the scale of the filter circuit 28.

Figure 4A:
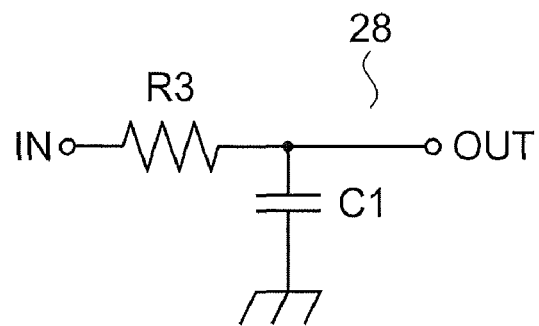
FIGS. 4A and 4B are drawings illustrating a filter circuit according to an embodiment as well as to an alternative embodiment.

In contrast, by inserting the filter circuit 28 between the variable amplifier circuit 26 and the ratiometric circuit 30 (the variable amplifier circuit 26 being positioned before the filter circuit 28), this embodiment effectively suppresses the superimposition of the power noise generated when the same power source is supplied to both the variable amplifier circuit 26 and the ratiometric circuit 30. Therefore, the filter circuit 28 is not required to have an advanced filtering characteristics, and a filter with simple circuit configuration may be used for the filter circuit 28. An example of such simple filter includes a passive low-pass filter circuit shown in FIG. 4A. The passive low-pass filter circuit includes an input node (IN), an output node (OUT), a direct-current resistor R3 arranged therebetween, and a capacitor C1 arranged between the output node (OUT) and a ground. Since the passive low-pass filter does not require a power circuit, a power noise is less likely to occur in the filtered signal V12 being output. As a result, the superimposition of the power noise is effectively suppressed in the ratiometric circuit 30 which receives the filtered signal V12.

Second Embodiment

Figure 5:
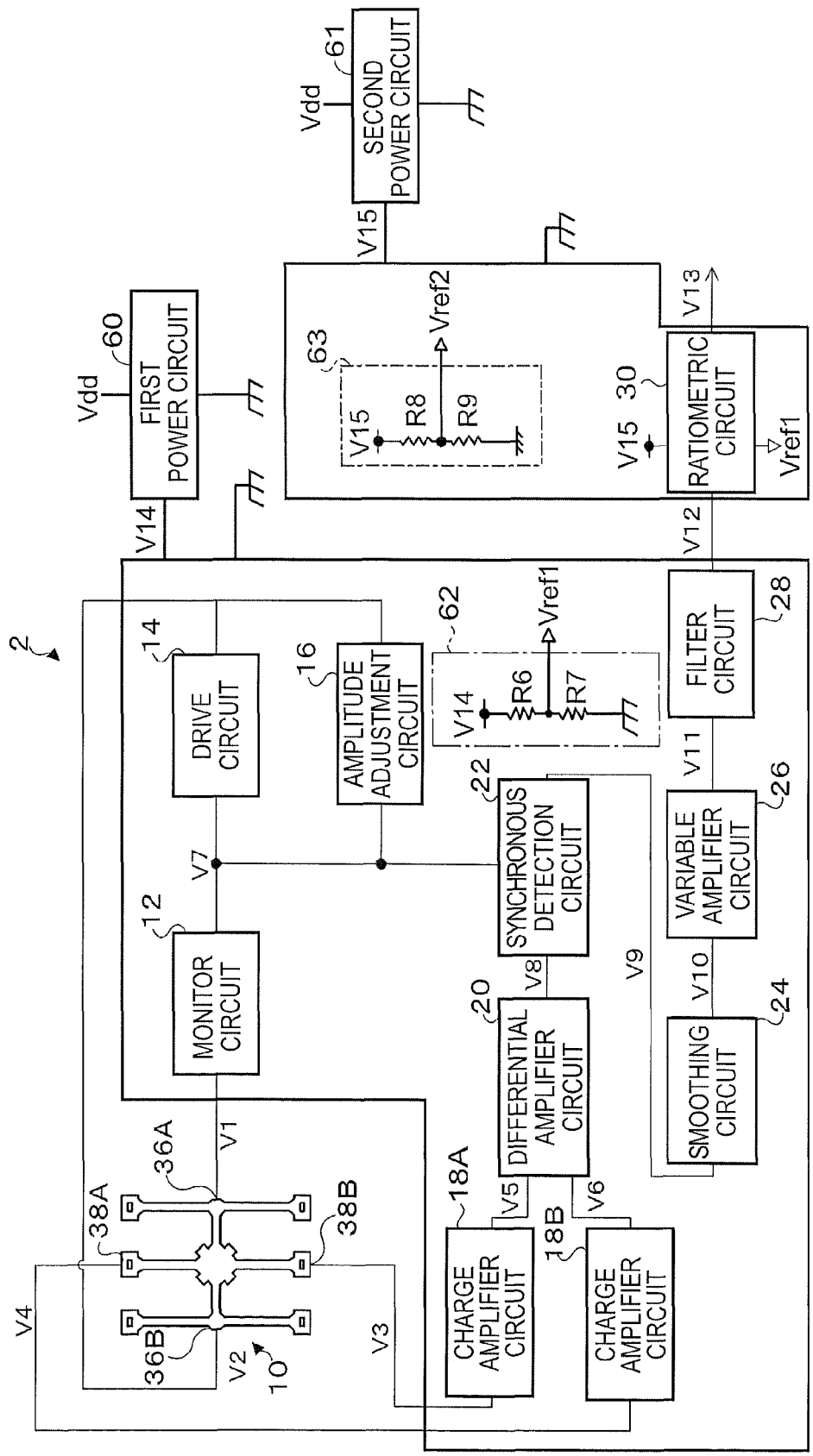
FIG. 5 is a block diagram of a circuit configuration of the vibration gyro sensor according to an alternative embodiment.

The second embodiment will now be described using FIG. 5. Description of the same structure as that of the first embodiment is omitted.

The vibration gyro sensor 2 includes a first reference voltage generation circuit 62, a second reference voltage generation circuit 63, a first power circuit 60, and a second power circuit 61.

The first power circuit 60 receives the power voltage Vdd, and outputs a galvanic supply voltage V14. The supply voltage V14 is supplied to the monitor circuit 12, the first reference voltage generation circuit 62, and all the circuits present between the filter circuit 28 and the charge amplifier circuits 18A and 18B (inclusive). The first reference voltage generation circuit 62 divides the supply voltage V14 with resistors R6 and R7, and outputs a first reference voltage Vref1. The reference voltage Vref1 output from the first reference voltage generation circuit 62 serves as a reference voltage in the operation of the charge amplifier circuits 18A and 18B, the differential amplifier circuit 20, the synchronous detection circuit 22, the smoothing circuit 24, the variable amplifier circuit 26, and the filter circuit 28.

The second power circuit 61 receives the power voltage Vdd, and outputs a galvanic supply voltage V15. The supply voltage V15 is supplied to the ratiometric circuit 30 and the second reference voltage generation circuit 63. The second reference voltage generation circuit 63 divides the supply voltage V15 with resistors R8 and R9, and outputs a second reference voltage Vref2. The ratiometric circuit 30 operates having the second reference voltage Vref2 output by the second reference voltage generation circuit 63 as a reference voltage.

As described, a supply voltage is divided into the supply voltage V15 and the supply voltage V14, respectively supplied to the ratiometric circuit 30 and a circuit before that. As a result, the power noises generated in the filter circuit 28 and in the ratiometric circuit 30 have different frequencies and phases. Consequently, the superimposition of the power noise is effectively suppressed. In other words, the power noise superimposed in the ratiometric circuit 30 is inhibited.

Figure 4B:
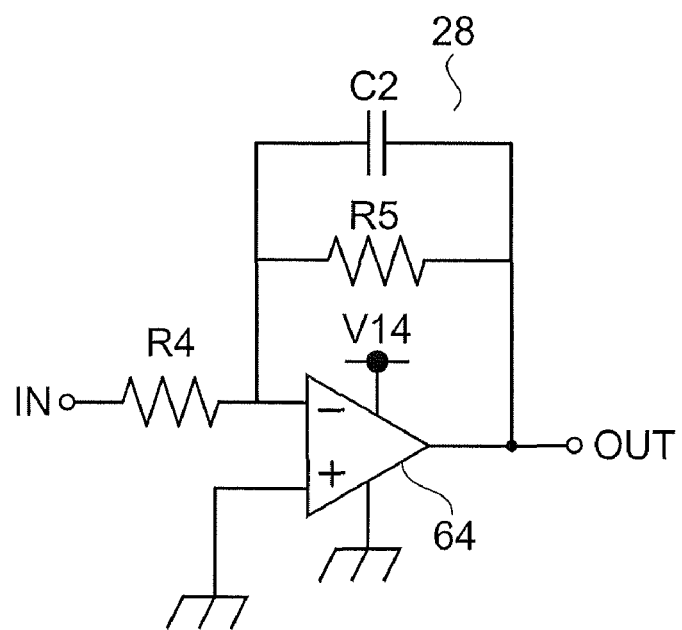

An example of the filter circuit 28 includes an active low-pass filter (SCF) circuit as shown in FIG. 4B. The active low-pass filter includes an input node (IN) and an output node (OUT). Further, between those nodes, a resistor R4 and an operational amplifier (op-amp) 64 are coupled in series. Moreover, between the output node and an input node of the op-amp 64, a resistor R5 and a feedback capacity C2 are coupled in parallel. The supply voltage V14 is supplied to the op-amp 64. In general, an amplification factor (gain) is represented as R5/R4, and a cut-off frequency is represented as $1/(2\pi*C2*R5)$.

At this time, the superimposition of noises is inhibited, since, even in the event where the power noise occurs in the supply voltage V14, the noise component present therein is different from that of the power noise of the supply voltage V15 which is supplied to the ratiometric circuit 30 provided in a subsequent stage.

The present invention shall not be limited to the content of the embodiments described above, and within the main scope of the invention, various modification may be carried out. For instance, included within a scope of the invention is a substantially identical structure as that of the ones described in the embodiments, such as a structure with identical function, method, and result as that of the embodiments, and, a structure with identical purpose and result. Moreover, the invention also includes, within the scope thereof, a structure in which a portion not essential to the structures described in the embodiments is replaced with an alternative portion. The invention further includes, within the scope thereof, a structure which exhibits an identical effect as the ones described in the embodiments, as well as a structure which achieves an identical purpose as the one described in the embodiments. Still further, the invention includes, within the scope thereof, a structure including known techniques applied to the structures described in the embodiments. The scope of the invention includes contents from which any of the technical matter described in the embodiments is excluded to a limited extent. The scope of the invention also includes contents from which a known technique is excluded, to a limited extent, from the embodiments described above.

The entire disclosure of Japanese Patent Application Nos: 2006-342285, filed Dec. 20, 2006 and 2007-285889, filed Nov. 11, 2007 are expressly incorporated by reference herein.

What is claimed is:

1. A vibration gyro sensor, comprising:
   a vibrating element;
   a pair of drive electrodes for driving the vibrating element;
   at least two detection electrodes for detecting Coriolis force applied to the vibrating element;
   a monitor circuit coupled with one of the pair of drive electrodes, so as to output a monitor signal;
   a drive circuit for amplifying the monitor signal so as to output an amplified signal to the other of the pair of drive electrodes;
   a differential amplifier circuit for differentially amplifying at least two signals obtained from the detection electrodes of the vibrating element, so as to output a differential amplified signal;
   a synchronous detection circuit for synchronously detecting the differential amplified signal with respect to the monitor signal, so as to output a detected signal;
   a filter circuit for outputting a filtered signal in which a noise of the detected signal is removed; and
   a ratiometric circuit which receives the filtered signal and outputs a sensitivity signal whose amplitude is proportional to variation of a power voltage.

2. The vibration gyro sensor according to claim 1, wherein the ratiometric circuit and a circuit which is previous to the filter circuit receive a common power source.

3. The vibration gyro sensor according to claim 2, wherein the filter circuit is a passive low-pass filter.

4. A vibration gyro sensor, comprising:
   a vibrating element;
   a pair of drive electrodes for driving the vibrating element;
   at least two detection electrodes for detecting Coriolis force applied to the vibrating element;
   a monitor circuit coupled with one of the pair of drive electrodes, so as to output a monitor signal;
   a drive circuit for amplifying the monitor signal so as to output an amplified signal to the other of the pair of drive electrodes;
   a differential amplifier circuit for differentially amplifying at least two signals obtained from the detection electrodes of the vibrating element, so as to output a differential amplified signal;
   a synchronous detection circuit for synchronously detecting the differential amplified signal with respect to the monitor signal, so as to output a detected signal;
   a filter circuit for outputting a filtered signal in which .a noise of the detected signal is removed; and
   a ratiometric circuit which receives the filtered signal and outputs a sensitivity signal whose amplitude is proportional to variation of a power voltage;
   a first power circuit for supplying a first power source to the filter circuit;
   a second power circuit for supplying a second power source to the ratiometric circuit;
   a first reference voltage generation circuit which receives the first power source and supplies a first reference voltage to a circuit being previous to the ratiometric circuit; and
   a second reference voltage generation circuit which receives the second power source and supplies a second reference voltage to the ratiometric circuit.

5. The vibration gyro sensor according to claim 4, wherein the filter circuit is an active low-pass filter driven by the first power source.

6. The vibration gyro sensor according to claim 1, wherein the vibrating element is a double-T shaped vibrating element.

7. The vibration gyro sensor according to claim 1, wherein the filter circuit includes an n-th order filter, where n is greater than or equal to 2.

8. The vibration gyro sensor according to claim 1, wherein the filter circuit is immediately previous to the ratiometric circuit.

9. The vibration gyro sensor according to claim 1, wherein the ratiometric circuit includes a multiplier.

10. The vibration gyro sensor according to claim 1, further comprising a voltage generation circuit that generates a reference voltage based on the power voltage,
    wherein the reference voltage is proportional to the power voltage; and
    wherein the ratiometric circuit multiplies the reference voltage by an amplitude of the filtered signal to generate the sensitivity signal.

* * * * *